United States Patent
Greenwald et al.

[11] Patent Number: 5,151,014
[45] Date of Patent: Sep. 29, 1992

[54] LIGHTWEIGHT AIRFOIL

[75] Inventors: C. Kent Greenwald, Cambridge; Leslie M. Gray, Lincoln; R. Bart Read, Maynard; William Stevens, Belmont, all of Mass.

[73] Assignee: Airflow Research and Manufacturing Corporation, Watertown, Mass.

[21] Appl. No.: 737,563

[22] Filed: Jul. 26, 1991

Related U.S. Application Data

[63] Continuation of Ser. No. 374,302, Jun. 30, 1989, abandoned.

[51] Int. Cl.⁵ ............................................. B64C 3/44
[52] U.S. Cl. .................................... 416/237; 416/243
[58] Field of Search .............. 416/236 R, 236 A, 237, 416/242, 243; 244/35 R, 198

[56] References Cited

U.S. PATENT DOCUMENTS

| | | | |
|---|---|---|---|
| 562,469 | 6/1896 | Hoyland | 416/237 |
| 675,477 | 6/1901 | Hall | 416/236 A |
| 914,857 | 3/1909 | Miller | 416/236 A |
| 1,206,058 | 11/1916 | Wakefield | 416/237 |
| 1,361,277 | 12/1920 | Mott | 416/237 |
| 1,606,887 | 11/1926 | Moody | 416/237 |
| 1,726,882 | 9/1929 | Boerner | 114/67 R |
| 1,831,780 | 10/1931 | Sharp | 244/198 |
| 2,010,094 | 8/1935 | Leinweber | 416/236 A |
| 2,157,999 | 5/1939 | Charavay | 416/242 |
| 2,682,925 | 7/1954 | Worsika | 416/226 |
| 3,000,401 | 9/1961 | Ringler | 138/39 |
| 3,077,173 | 2/1963 | Lang | 416/237 |
| 3,578,264 | 5/1971 | Kuethe | 244/40 |
| 3,588,005 | 6/1971 | Rethorst | 244/41 |
| 3,706,430 | 12/1972 | Kline et al. | 416/223 R X |
| 4,434,957 | 3/1984 | Moritz | 416/223 R |

FOREIGN PATENT DOCUMENTS

| | | |
|---|---|---|
| 320775 | 7/1914 | Fed. Rep. of Germany .... 244/35 R |
| 323762 | 9/1918 | Fed. Rep. of Germany . |
| 348054 | 3/1920 | Fed. Rep. of Germany . |
| 449378 | 9/1927 | Fed. Rep. of Germany ...... 416/237 |
| 450880 | 12/1912 | France ................................ 416/236 |
| 9750 | of 1893 | United Kingdom ................ 416/243 |
| 17935 | of 1911 | United Kingdom . |
| 159207 | 5/1922 | United Kingdom ................ 416/243 |
| 2032048 | 4/1980 | United Kingdom ................ 416/237 |

Primary Examiner—John T. Kwon
Attorney, Agent, or Firm—Fish & Richardson

[57] ABSTRACT

An airfoil having a suction surface and a pressure surface, the surfaces joined together at leading and trailing portions of the airfoil, the pressure surface converging toward the suction surface at a corner, the surface converging at the corner by an angle approximately equal to or greater than at least 30°, such that an air stream flowing from the leading edge and over the pressure surface separates from the pressure surface at the corner. The fan therefore has a thick nose section and is substantially thinner over the majority of its chord length. One or more guide ribs extend from the pressure surface to control the flow of boundary layer air.

9 Claims, 3 Drawing Sheets

LIGHTWEIGHT AIRFOIL

This is a continuation of copending application Ser. No. 07/374,302 filed on Jun. 30, 1989, now abandoned.

BACKGROUND OF THE INVENTION

This invention relates to airfoils, and particularly to airfoils used in fans.

FIG. 1a illustrates a typical prior art airfoil 8 having a leading edge 10, a trailing edge 12, and substantially parallel surfaces 14, 16. As shown in FIG. 1b, when airfoil 8 contacts a stream of air 17, the air stream engages leading edge 10, and separates into streams 18, 20. Stream 18 passes along surface 14 while stream 20 passes along surface 16. As is well known, stream 18 travels a greater distance than stream 20, with that result that air adjacent to surface 16 is at a higher pressure than air adjacent to surface 14. Consequently, surface 16 is referred to as the "pressure side" of the airfoil, and surface 14 is referred to as the "suction side" of the airfoil.

Noise is generated by airfoils due to pressure fluctuations in the air passing over each of the airfoil surfaces. The noise level can be reduced by increasing the thickness of the airfoil. However, the weight of the airfoil increases as it becomes thicker thereby increasing manufacturing costs and decreasing performance.

SUMMARY OF THE INVENTION

The invention generally features an airfoil comprising a suction surface and a pressure surface, the surfaces joined together at leading and trailing portions of the airfoil, the pressure surface diverging toward the suction surface at a corner by an angle approximately equal to or greater than 30°, such that an air stream flowing from the leading edge and over the pressure surface separates from the pressure surface at the corner.

In the preferred embodiment, the angle is greater than 30° and the corner is located a distance from the leading portion equal to between 5% and 10% of the overall chord length of the airfoil. The thickness of the airfoil is substantially constant for the portion of the airfoil between the corner and the trailing portion. The thickness of the portion of the airfoil between the leading portion and the corner is approximately twice the thickness of the portion of the airfoil between the corner and the trailing portion.

The invention also generally features an airfoil comprising a suction surface and a pressure surface, the surfaces joined together at leading and trailing portions of the airfoil, one of the surfaces diverging toward the other surface such that an air stream flowing from the leading edge and over the one surface separates from the one surface, the one surface comprising at least one guide rib to control the flow of boundary layer air on the one surface. The diverging surface is the pressure surface and the guide rib is approximately parallel to a line extending from the leading portion to the trailing portion and is a substantially rectangular projection on the pressure surface. The pressure surface diverges at a corner, and the guide rib extends from the corner toward the trailing edge portion. Two guide ribs are preferably used.

Since air flowing over the pressure surface separates at the corner where the pressure surface diverges toward the suction surface, the flow of air over the airfoil will be substantially the same as the flow of air over a much thicker airfoil whose pressure surface does not diverge. However, since the thickness of the airfoil of the present invention is substantially reduced over most of its chord length, it is substantially lighter than thicker prior art airfoils exhibiting the same flow characteristics. The airfoil of the present invention therefore achieves the advantages of a thick airfoil, e.g., reduced noise, but is much lighter than prior art thick airfoils, thereby reducing manufacturing costs and increasing efficiency.

DETAILED DESCRIPTION OF THE PREFERRED EMBODIMENTS

DRAWINGS

FIG. 1b illustrates air flowing over the airfoil of FIG. 1a.

FIG. 2b illustrates air flowing over the airfoil of FIG. 2a.

FIG. 3 is an enlarged view of a section of the airfoil shown in FIG. 2a.

STRUCTURE AND OPERATION

Figure 1A:
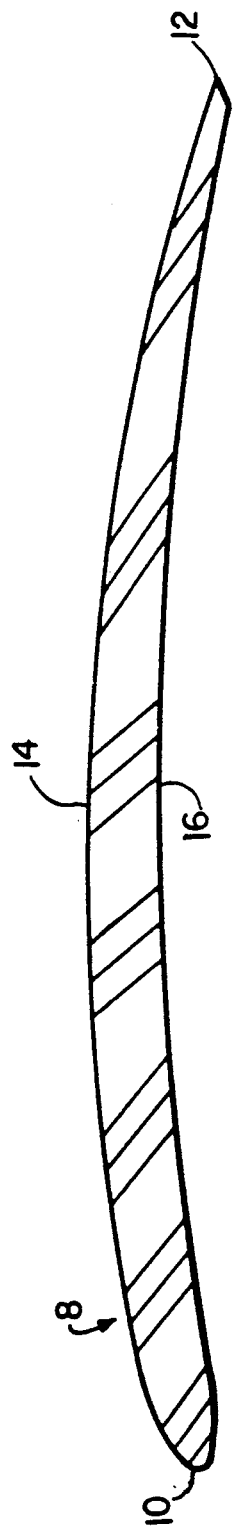
FIG. 1a is a cross-sectional view of a prior art airfoil.
Figure 1B:
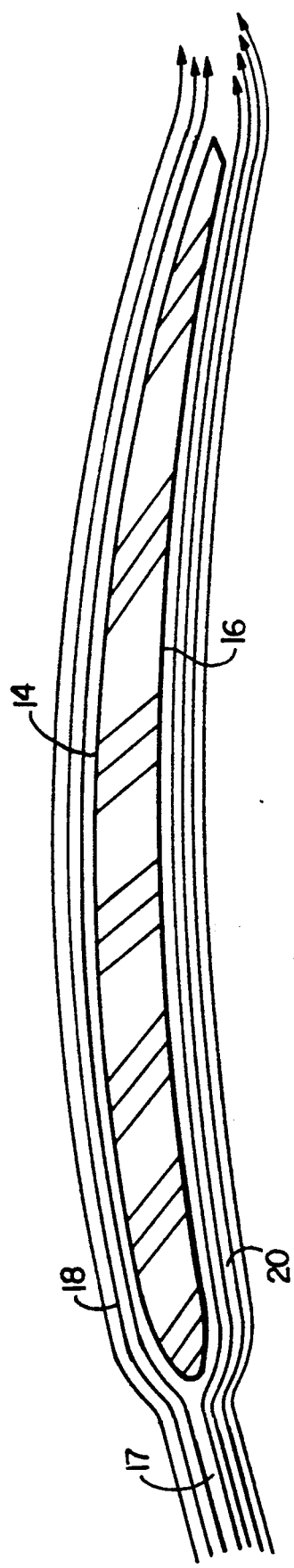
Figure 2A:
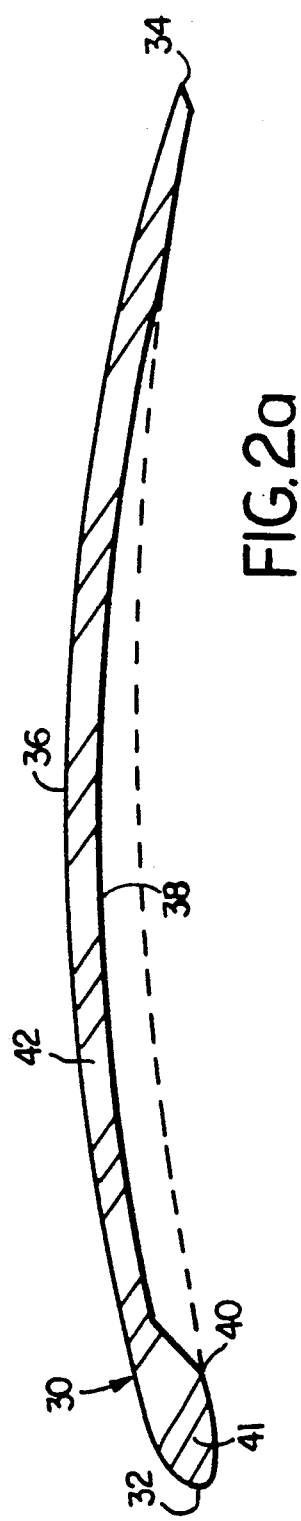
FIG. 2a is an airfoil in accordance with the present invention.

Referring to FIG. 2a, airfoil 30 comprises leading edge 32, trailing edge 34, and substantially parallel surfaces 36 and 38, surface 36 being a suction surface and surface 38 being a pressure surface. Surface 38 includes a sharp corner 40, such that surface 38 diverges or bends towards surface 36, thereby creating a thick "nose section" 41 and a reduced thickness portion 42. The distance between corner 40 and leading edge 32 is between 5% and 10% of the chord length of the airfoil. The dashed line in FIG. 2a illustrates a pressure surface of a typical prior art airfoil (see FIG. 1).

Figure 2B:
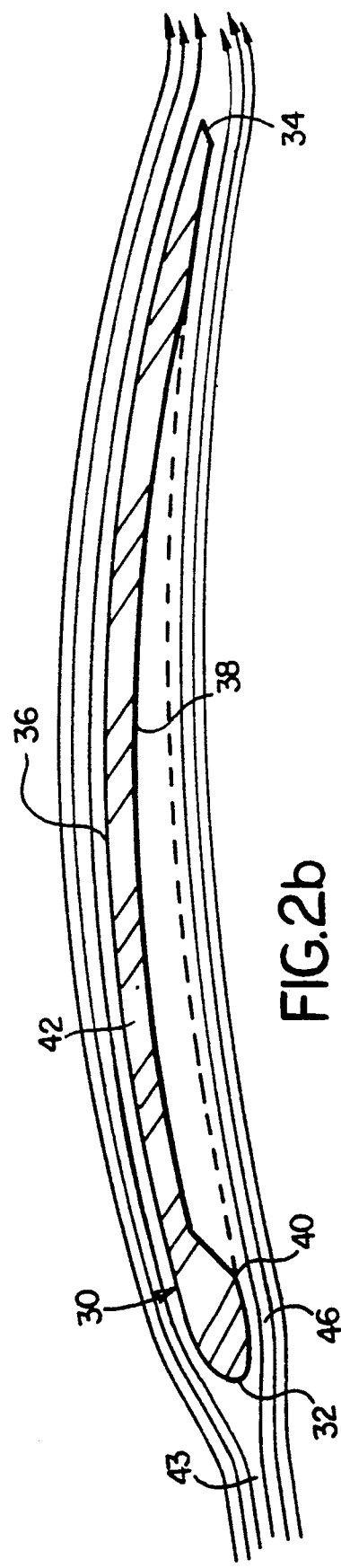

FIG. 2b illustrates the flow of air over airfoil 30. A stream of air 43 intersects airfoil 30 at leading edge 32, and separates into streams 44 and 46. Stream 44 flows along surface 36. Stream 46, however, will not flow along surface 38, but will separate from surface 38 at corner 40. Stream 46 will actually follow a path that is very similar to the path followed by stream 20 in FIG. 1b. Therefore, airfoil 30 has substantially the same flow characteristics as the airfoil illustrated in FIG. 1.

Figure 3:
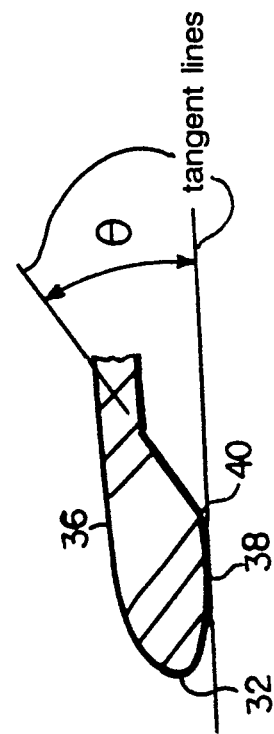

In order to ensure that stream 46 separates from surface 38, the angle at which pressure surface 38 diverges at corner 40 must be greater than a threshold angle. If the bend is too gradual, stream 46 will turn at corner 40 and remain close to surface 38, resulting in increased loading and noise. Referring to FIG. 3, in the preferred embodiment corner 40 bends at an angle $\theta$ of at least 30°. Angle $\theta$ is measured between lines tangent to surface 38 on each side of corner 40.

While the vast majority of stream 46 will follow the path shown in FIG. 2b, there will be some air that flows next to the portion of surface 38 along reduced thickness portion 42. This "boundary layer" flow may travel along surface 38 in a direction other than toward trailing edge 34. This travel of the boundary layer can interfere with fan performance by, e.g., disrupting the external flow.

Figure 4:
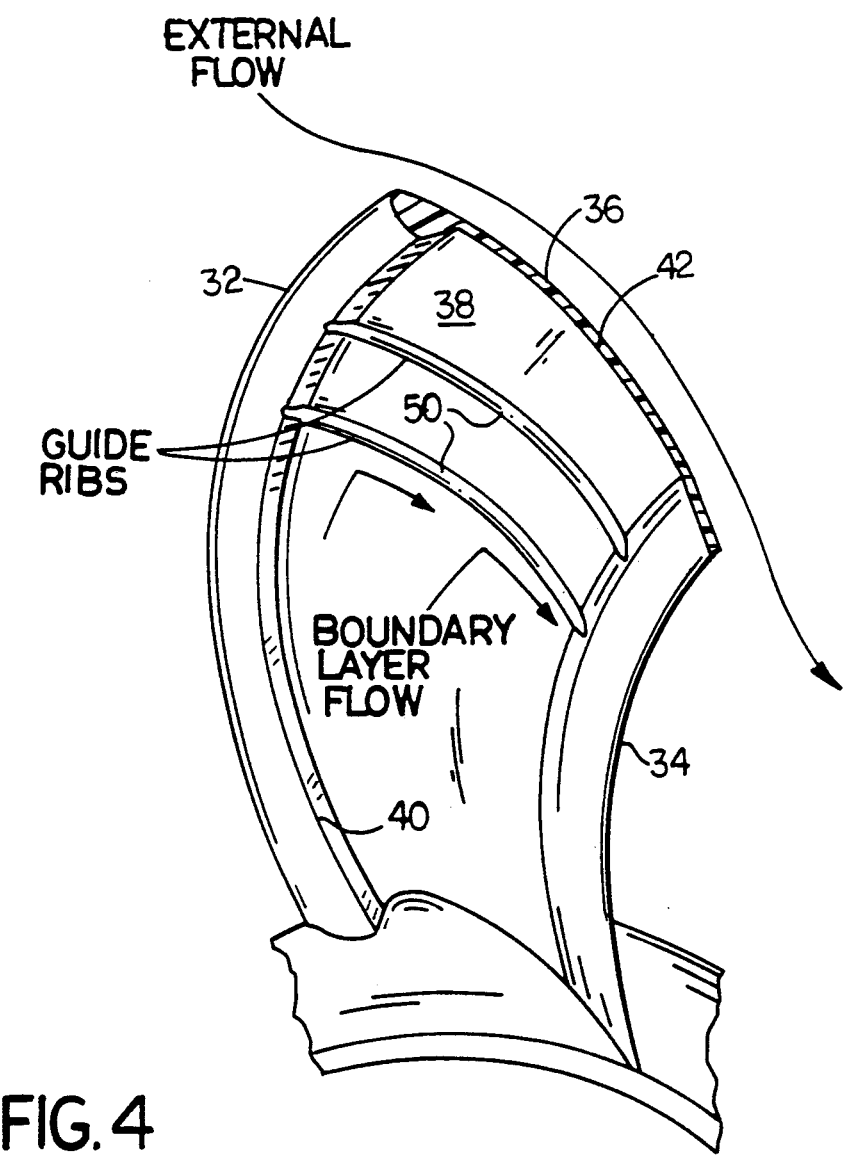
FIG. 4 is a perspective view of a section of the airfoil shown in FIG. 2.

Referring to FIG. 4, a perspective view of a section of airfoil 30 is shown attached to a section of a hub, which supports several airfoils (not shown). Two guide ribs 50 extend from surface 38 across reduced thickness portion 42 from corner 40 toward trailing edge 34. Guide ribs 50 will redirect boundary layer flow of air toward trailing edge 34 such that the boundary layer flow will not interfere with the external flow. Several guide ribs may be placed throughout the length of airfoil 30.

We claim:

1. An airfoil comprising a suction surface and a pressure surface, said surfaces joined together at landing and trailing portions of said airfoil, said pressure surface converging toward said suction surface by an angle approximately equal to or greater than 30° to form an abrupt corner wherein during operation an air stream flowing from said leading edge and over said pressure surface separates from said pressure surface at said corner and reattaches to said pressure surface at a section of said pressure surface substantially closer to said trailing edge and wherein said abrupt corner is characterized by an abrupt change in the slope of said pressure surface at said corner and appears in a cross-sectional view of the airfoil to be formed by the intersection of a first and a second line wherein said first line corresponds to the pressure on one side of the abrupt corner and the second line corresponds to the pressure surface on the other side of the abrupt corner.

2. The airfoil of claim 1 wherein said corner is located a distance from said leading portion equal to between 5% and 10% of the chord length of said airfoil.

3. The airfoil of claim 1 wherein the thickness of said airfoil is substantially constant for a portion of said airfoil between said corner and said trailing portion.

4. The airfoil of claim 1 wherein the thickness of a first portion of said airfoil between said leading portion and said corner is approximately twice the thickness of a second portion of said airfoil between said corner and said trailing portion.

5. An airfoil comprising a suction surface and a pressure surface, said surfaces joined together at leading and trailing portions of said airfoil, said pressure surface converging toward said suction surface by an angle approximately equal to or greater than 30° to form an abrupt corner, wherein said abrupt corner is characterized by an abrupt change in the slope of pressure surface at said corner and appears in a cross-sectional view of the airfoil to be formed by the intersection of a first and a second line wherein said first line corresponds to said pressure surface on one side of the abrupt corner and the second line corresponds to said pressure surface on the other side of the abrupt corner, and wherein during operation an air stream flowing from said leading edge and over said pressure surface separates from said pressure surface, said pressure surface comprising at least one guide rib on a portion of said pressure surface from which said air stream has separated to control the flow boundary layer air on said portion of said pressure surface.

6. The airfoil of claim 5 wherein said guide rib is a substantially rectangular projection on said pressure surface.

7. The airfoil of claim 5 wherein said guide rib is approximately parallel to a line extending from said leading portion to said trailing portion.

8. The airfoil of claim 5 including at least two guide ribs.

9. The airfoil of claim 5 wherein said one surface converges at a corner, and said guide rib extends along said one surface from said corner toward said trailing edge portion.

* * * * *